Patented July 27, 1926.

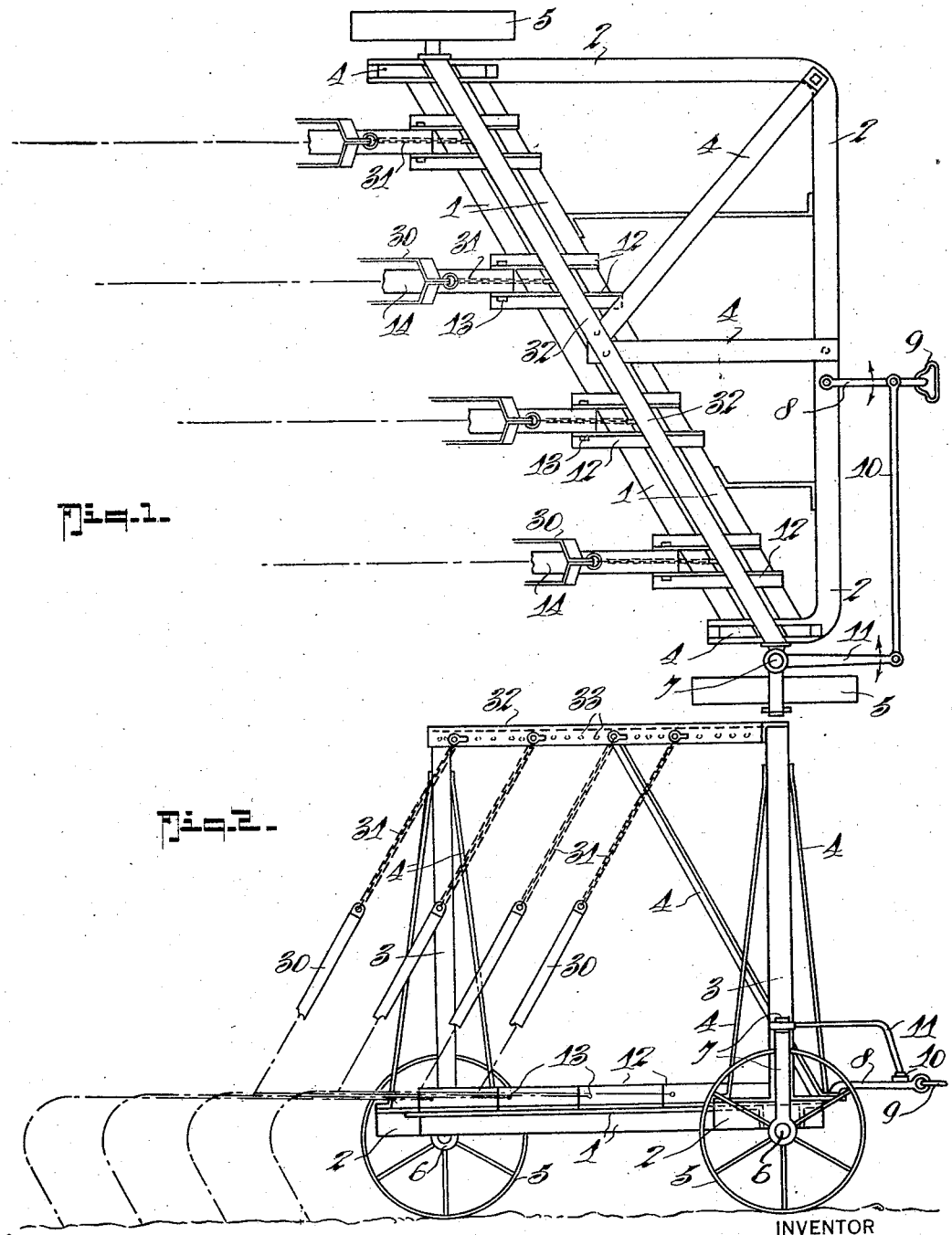

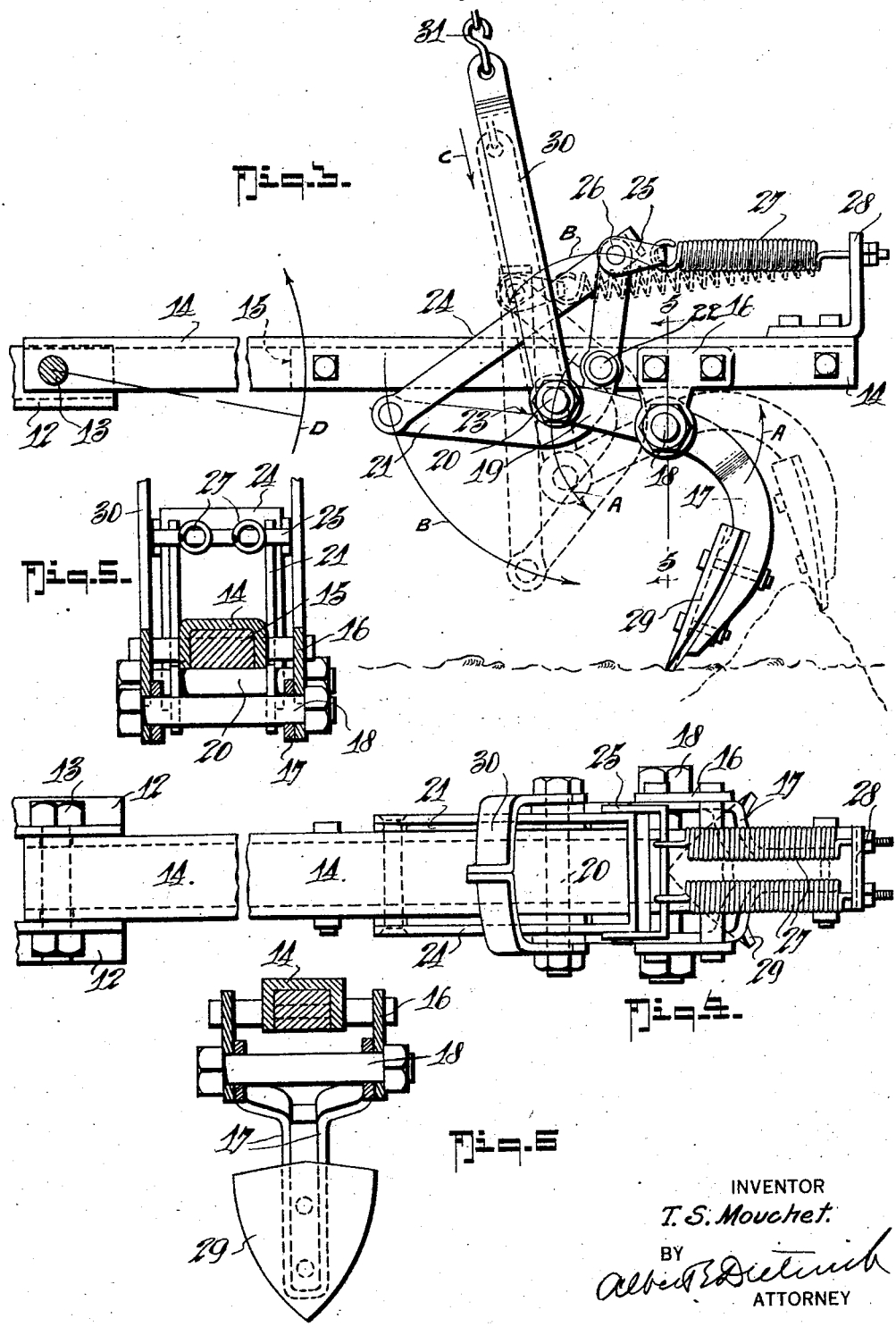

1,594,106

UNITED STATES PATENT OFFICE.

THEODORA S. MOUCHET, OF BOWERSVILLE, GEORGIA.

GANG PLOW.

Application filed April 29, 1925. Serial No. 26,760.

The invention generally relates to plows and has for its object to provide a plow of the flexibly connected gang type adapted for being tractor pulled in a manner automatically effecting proper guiding thereof, and in which the individual plow units are so constructed and mounted that the plow share thereof may yield when striking a fixed obstruction and actuate means for positively elevating the same to facilitate surmounting of the obstruction without danger of breakage.

With the above and other objects in view that will hereinafter appear, the invention further resides in the novel details of construction, combination and arrangement of parts, all of which will be first fully described, then be particularly pointed out in the appended claims, reference being had to the accompanying drawings, in which:—

Figure 1 is a somewhat diagrammatic plan view illustrating the mounting framework of the invention.

Figure 2 is a view similar to Figure 1 showing the parts there illustrated in side elevation.

Figure 3 is a side elevation of one plow unit.

Figure 4 is a plan view of one plow unit.

Figure 5 is a cross section taken on the line 5—5 on Figure 3 looking in the direction of the arrows.

Figure 6 is a cross section taken on the line 5—5 on Figure 3 looking in the direction opposite that indicated by the arrows.

In the drawings, in which like numerals of reference designate like parts in all of the figures, 1 represents a pair of diagonally positioned angle iron support bars which are secured to the short and long arms of the bail-shaped frame bar 2. Upright side standards 3 are mounted upon the long and short arms of the bar 2 and suitably supported in their upright position as at 4.

Supporting wheels 5 are mounted upon the framing in suitable bearings 6 and the one thereof cooperating with the short arm of the framing 2 is vertically pivotally mounted as at 7 so as to act as a guiding medium.

A draft bar 8 is connected to the front portion of the frame bar 2 and is provided with a suitable tractor hitch connection 9. The draft bar 8 is also link connected as at 10 to the steering crank 11 secured to the pivotal connection of the pivoted wheel 5 so that, as the plow is drawn along the ground by a tractor or other towing medium, movement of the draft bar 8 will effect a guiding of the pivoted wheel 5 according to the direction of travel of the said towing medium.

A plurality of pairs of angle irons 12 are secured upon the top faces of the bars 1 and serve to provide pivotal connections, as at 13, for the individual plow beams 14, it being understood that as many pairs of angle irons 12 may be mounted upon the diagonal bars 1 as may be desired according to the number of plow units to be used.

The plow beams 14, by reason of their pivotal connection as at 13, will be forced into active engagement with the ground by force of gravity, and if it should be found necessary to weight the said bars so as to facilitate the penetration of the plow shares into the ground the same may be weight provided as at 15.

A pair of pivot bearing brackets 16 are secured to the opposite sides of each beam 14 and a suitable plow share carrying gooseneck 17 is pivoted between the said brackets as at 18. The fore ends of the gooseneck are extended as at 19 and are connected by a suitable cross bolt 20.

A pair of tension arms 21 are pivoted one to each side of the beams 14 as at 22, and are provided with curved portions 23 which extend beneath and are adapted to upwardly engage the cross bolt 20 above referred to. The curved portions 23, in addition to a purpose soon to be described, provide a sort of V shape to the arms 21 and the ends of the said arms are connected by a strengthening U brace member 24, and the said members 12 and 24 are normally held up to the position illustrated in full lines in Figure 3 of the drawings by spring action. A spring securing clip 25 is connected to the uppermost joined ends of the arms 21 and 24 as at 26 and serve as a fore means of connection for the pair of tension springs 27 adjustably connected at the rear ends, as at 28, to the beam 14.

In the matter just above described the tension frames composed by the members 21 and 24 are normally swung on their pivots 22 up into position for having the curved portions 23 thereof engage the cross bolt 20 and hold the same tightly against the under surfaces of the beam 14 to hold the gooseneck 17 to the normal or active position illustrated in full lines in Figure 3 of the drawings.

Any desired shape of plow share 29 to fit the desired use of the gang plow may be secured to the lower end of the gooseneck 17.

Substantially U shaped lifter arms 30 are connected to the ends of the cross bolt 20 carried by the forwardly projecting ends 19 of the gooseneck 18 and each of the said lifter arms are adapted to be chain connected as at 31 to the upper cross beam 32 supported at the upper ends of the vertical standards 3 hereinbefore referred to. The cross beam 32 may be provided with suitable apertures 33 so that the upper connection for the chains 31 may be adjusted as to position or length for the obvious purpose of adjusting the downward limit of movement of the plow beams 14 on their pivots 13 to limit the degree of penetration of the plow shares according to the adjustment of the said chains.

By reference to Figure 3 of the drawing it will be observed that under normal conditions (see full lines) the gang of plow units will be drawn along the ground and will penetrate the same by gravity action to a limit controlled by the adjustment of the chains 31. Should a fixed obstruction, such as a rock indicated in dotted lines in the same figure, be encountered the plow share 29 and the gooseneck 17 would be permitted to move on its pivot 18 as indicated by the arrows A, the cross bolt 20 engaging the curved surfaces 23 of the frames 21 and 24 causing them to move on their pivots 22 as indicated by the arrows B against the tension of the springs 27 and also causing a downward pull on the lifter arms 30 and chains 31 as indicated by the arrow C, effecting a bodily lifting of the beams 14 and plow shares carried thereby such as will effectively lift the said plow shares over the obstruction. See arrow D.

By reason of thus providing means for permitting a rearward flexing of the plow share when engaging the fixed obstruction, and connections actuated by such rearward flexing of the plow share for effecting a bodily lifting of the same over the obstruction, all danger of breakage of a plow unit is overcome in a simple and effective manner.

From the foregoing description, taken in connection with the accompanying drawings, it is thought that the novel details of construction, the manner of operation and the advantages of my invention will be readily apparent to those skilled in the art to which it relates.

What I claim is:

1. A gang plow comprising a supporting framing having an upper transverse beam, plow units each including a beam pivoted at its front end to the framing, a plow share and means for yieldiably mounting the plow share at the rear end of the beam, and chains connected directly between the transverse beam and the plow share mounting means whereby when a plow share yields to an obstruction its connected chain will cause a lifting of the plow share over the obstruction.

2. A gang plow comprising a supporting framing having an upper transverse beam, plow units pivoted at their front ends to the framing to penetrate the ground by gravity action, chains connected to the transverse beam for limiting the degree of penetration of the plow units, means carried by each plow unit for yieldably supporting a plow share in a manner permitting yielding thereof on engagement with a fixed obstruction, and means connecting the yieldable mounting means and the penetration limiting chains whereby when the yielding action takes place a lifting of the plow unit will be effected.

3. A gang plow comprising a supporting framing having an upper transverse beam; plow units pivoted at their front ends to the framing to penetrate the ground by gravity action; each said unit including a plow beam, a plow share carrying member pivoted to said beam, spring devices for normally holding the carrying member to a plowing position and yieldable upon engagement with a fixed obstruction; and lifter arms connected to the upper transverse beam of the framing and each plow share carrying member for effecting a lifting of that member as it yields under obstruction engagement for lifting the respective plow share over said obstruction.

4. In a gang plow comprising a supporting framing; a plow unit pivotally connected to the framing for penetrating the ground by gravity action; said unit comprising a plow beam, a plow share carrying member pivoted to the beam with the fore end thereof projected beyond the pivoted connection thereof, pivoted tension arms adapted for engaging the fore projected end of the said member to exert an upward pressure thereon and hold it to its normal plowing position, springs connected with the said arms to hold them to their normal position and permitting yielding of the plow share member on engagement with a fixed obstruction.

5. In a gang plow comprising a supporting framing; a plow unit pivotally connected to the framing for penetrating the ground by gravity action; said unit comprising a plow beam, a plow share carrying member pivoted to the beam with the fore end thereof projected beyond the pivoted connection thereof, and a lifter arm connected with the fore projected end of the said member and to a portion of the supporting framing whereby when an obstruction is encountered the plow share member will be lifted over the same.

6. In a gang plow comprising a supporting framing; a plow unit pivotally connected to the framing for penetrating the ground by gravity action; said unit comprising a plow beam, a plow share carrying member pivoted to the beam with the fore end thereof projected beyond the pivoted connection thereof, tension arms for engaging the fore projected end of the said member to hold it to its normal plowing position, springs connected with the said arms to hold them to their normal position and permitting yielding of the plow share member on engagement with a fixed obstruction, and a lifter arm connected with the fore projected end of the said member and to a portion of the supporting framing whereby when the plow share member yields it will be lifted.

THEODORA S. MOUCHET.